United States Patent
Berkey et al.

(10) Patent No.: US 11,673,822 B2
(45) Date of Patent: Jun. 13, 2023

(54) METHOD AND APPARATUS FOR CONTROLLING GLASS TUBE TAPER

(71) Applicant: CORNING INCORPORATED, Corning, NY (US)

(72) Inventors: Adam Charles Berkey, Pittsburgh, PA (US); Eliot Geathers, Mission, TX (US); Daniel Warren Hawtof, Corning, NY (US); Douglas Edward McElheny, Big Flats, NY (US); Jiandong Meng, Painted Post, NY (US); Elias Panides, Horseheads, NY (US); Gaozhu Peng, Horseheads, NY (US); Randy Lee Rhoads, Horseheads, NY (US); Yuriy Yurkovskyy, Corning, NY (US); Chunfeng Zhou, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 115 days.

(21) Appl. No.: 16/464,231

(22) PCT Filed: Nov. 30, 2017

(86) PCT No.: PCT/US2017/063906
§ 371 (c)(1),
(2) Date: May 24, 2019

(87) PCT Pub. No.: WO2018/102531
PCT Pub. Date: Jun. 7, 2018

(65) Prior Publication Data
US 2019/0284081 A1    Sep. 19, 2019

Related U.S. Application Data

(60) Provisional application No. 62/428,005, filed on Nov. 30, 2016.

(51) Int. Cl.
*C03B 17/04* (2006.01)

(52) U.S. Cl.
CPC .................................. *C03B 17/04* (2013.01)

(58) Field of Classification Search
CPC .............................. C03B 17/04; C03B 17/025
See application file for complete search history.

(56) References Cited

U.S. PATENT DOCUMENTS

| 586,188 A | 7/1897 | Houghton |
| 2,009,793 A | 7/1935 | Sanchez-Velio |
(Continued)

FOREIGN PATENT DOCUMENTS

| CN | 105026324 A | 11/2015 |
| DE | 102005031657 A1 | 1/2007 |
(Continued)

OTHER PUBLICATIONS

International Search Report & Written Opinion dated Mar. 15, 2018, for PCT/US2017/063906 filed Nov. 30, 2017. pp. 1-14.
(Continued)

*Primary Examiner* — Lisa L Herring
(74) *Attorney, Agent, or Firm* — F. Brock Riggs

(57) ABSTRACT

A glass tube manufacturing apparatus for manufacturing glass tubing includes a glass delivery tank with molten glass. The glass delivery tank has a bottom opening. A bell has an upper portion with an outer diameter located at the bottom opening. A heating apparatus is at least partially disposed around the bell. The heating apparatus includes a heated portion and a muffle portion located below the heated portion. A lower extended muffle structure extends downwardly from the muffle portion. The lower extended muffle structure extending about the glass tubing on all sides to manage convective airflow therethrough.

13 Claims, 15 Drawing Sheets

(56) References Cited

U.S. PATENT DOCUMENTS

| | | | |
|---|---|---|---|
| 2,462,805 A | | 2/1949 | Danner |
| 2,958,160 A | * | 11/1960 | Cooke .................... C03B 17/04 |
| | | | 65/161 |
| 3,307,446 A | * | 3/1967 | Rottmann .............. G01B 11/06 |
| | | | 356/632 |
| 3,410,675 A | | 11/1968 | Dockerty |
| 3,717,450 A | | 2/1973 | Loughridge et al. |
| 4,175,941 A | | 11/1979 | Lagos et al. |
| 4,228,206 A | | 10/1980 | Fabisak |
| 4,312,659 A | * | 1/1982 | Panarello ................ C03B 35/26 |
| | | | 65/182.2 |
| 4,717,607 A | | 1/1988 | Pfizenmaier et al. |
| 5,017,209 A | * | 5/1991 | Yoshimura .......... C03B 37/0146 |
| | | | 165/135 |
| 5,080,705 A | | 1/1992 | Ott et al. |
| 5,192,718 A | | 3/1993 | Danielson |
| 5,213,599 A | | 5/1993 | Geertman et al. |
| 5,284,499 A | | 2/1994 | Harvey et al. |
| 5,688,300 A | * | 11/1997 | Ashley .................... C03B 17/04 |
| | | | 65/157 |
| 5,766,298 A | | 6/1998 | Ashley et al. |
| 6,098,258 A | | 8/2000 | Shimomura |
| 6,218,775 B1 | | 4/2001 | Tammaro |
| 7,475,567 B2 | | 1/2009 | Maenner et al. |
| 8,291,730 B2 | | 10/2012 | Skarzenski et al. |
| 8,464,554 B2 | | 6/2013 | Fredholm et al. |
| 8,726,694 B2 | | 5/2014 | Ziegler et al. |
| 8,875,543 B2 | | 11/2014 | Dannoux et al. |
| 2001/0055930 A1 | * | 12/2001 | Ott .......................... C03C 3/095 |
| | | | 65/59.27 |
| 2005/0227027 A1 | | 10/2005 | Maenner et al. |
| 2006/0260360 A1 | | 11/2006 | Dick et al. |
| 2009/0047454 A1 | | 2/2009 | Maenner et al. |
| 2009/0064715 A1 | | 3/2009 | Horn et al. |
| 2009/0320528 A1 | | 12/2009 | Skarzenski et al. |
| 2013/0186143 A1 | | 7/2013 | Ziegler et al. |
| 2014/0226948 A1 | * | 8/2014 | Enomoto .............. C03B 37/027 |
| | | | 385/147 |
| 2015/0197442 A1 | | 7/2015 | Bisson et al. |
| 2019/0062193 A1 | * | 2/2019 | Otter ........................ C03C 3/06 |
| 2020/0165150 A1 | * | 5/2020 | Mundy ................... C03B 17/04 |

FOREIGN PATENT DOCUMENTS

| | | | | |
|---|---|---|---|---|
| JP | 08165127 A | * | 6/1996 | ............. C03B 17/04 |
| JP | 2002321934 A | | 11/2002 | |
| JP | 2005298326 A | | 10/2005 | |
| JP | 2016117611 A | | 6/2016 | |

OTHER PUBLICATIONS

"Grashof Numbers, A Helpful Way to Look at Convective Effects", Rice, (2005) William Hoy, Taryn Roos, pp. 1-2. [retrieved on Apr. 24, 2020]. Retrieved from the Internet: <www.owlnet.rice.edu/~ceng402/proj05/hoy/hoyroos/background/background.html>.

English Translation of Chinese 1st Office Action & Search Report dated Jun. 16, 2021, for CN Patent Application No. 201780074289.3. pp. 1-17.

Office Action dated Nov. 22, 2021 in related Korean Patent Application No. 10-2019-7017694, 2 pages.

Second Chinese Office Action dated Dec. 31, 2021, pertaining to Application No. CN201780074289.3 filed Nov. 30, 2017, 6 pgs.

Japanese Office Action dated Oct. 27, 2021 in related Japanese Application No. 2019-529177, 3 pgs.

* cited by examiner

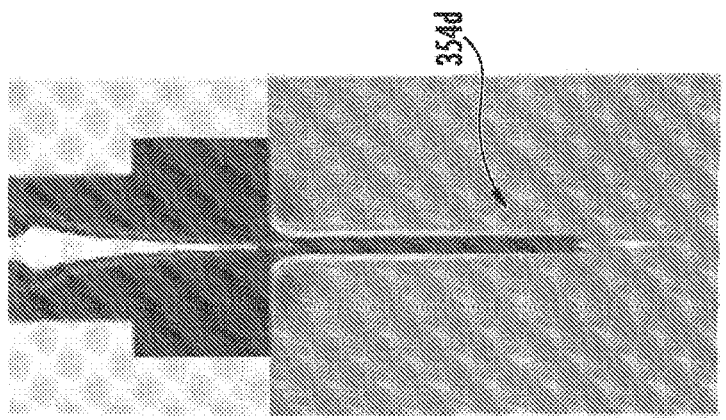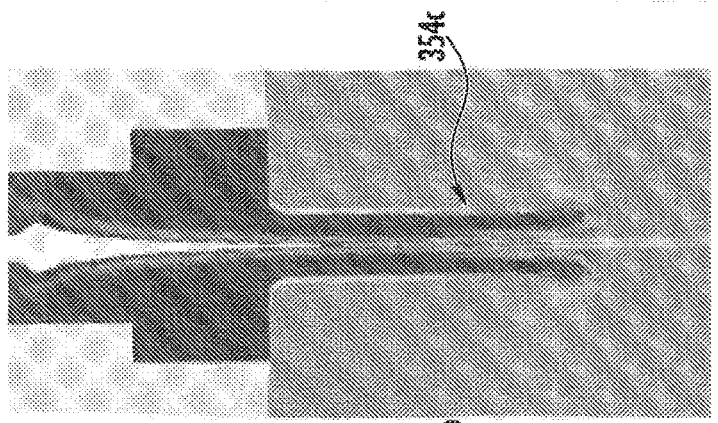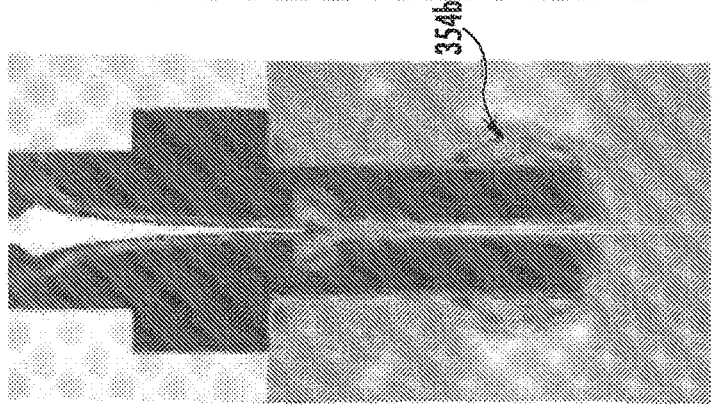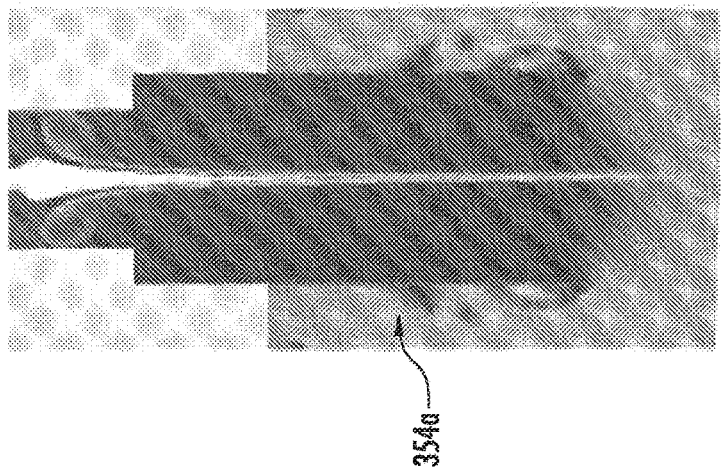

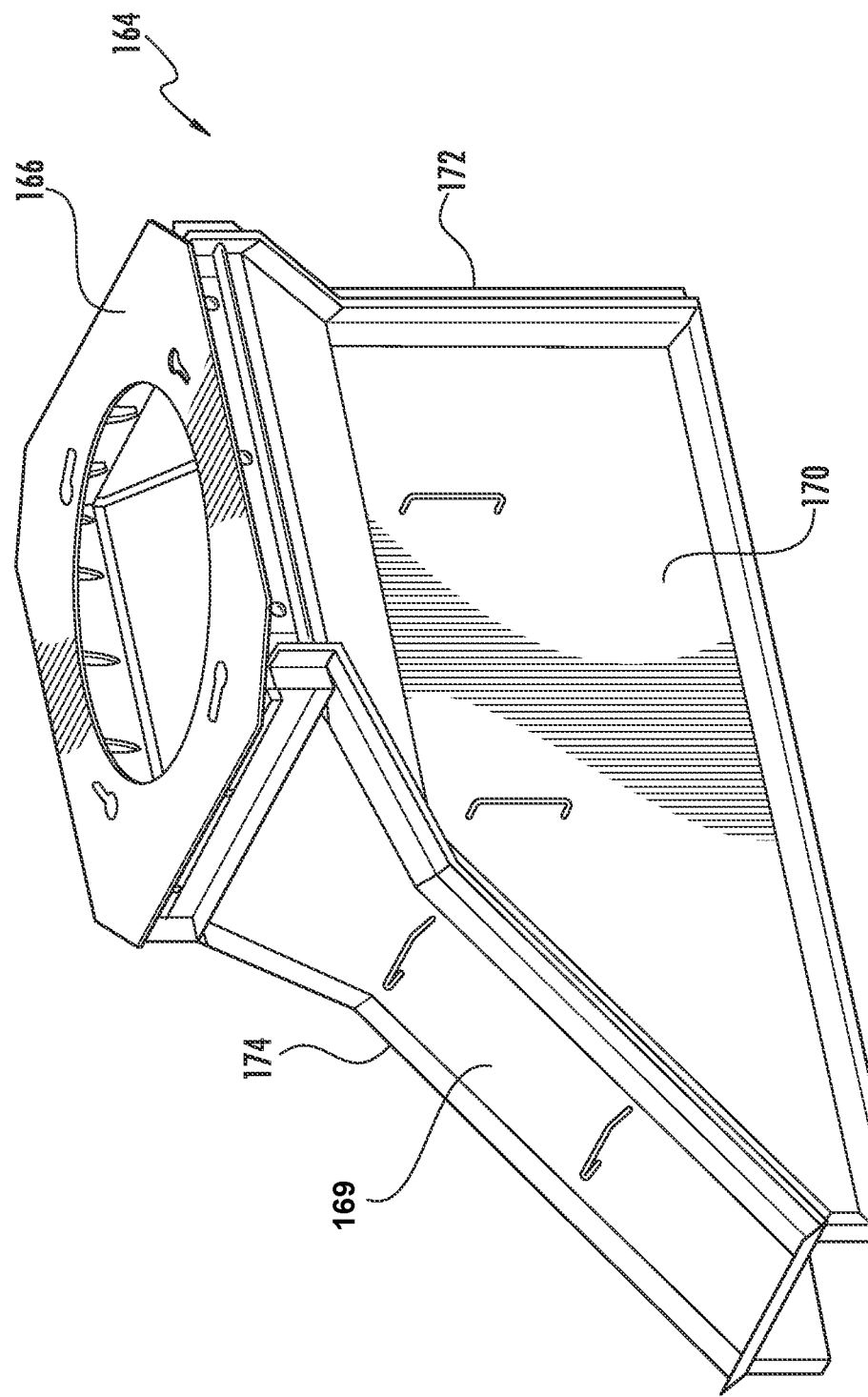

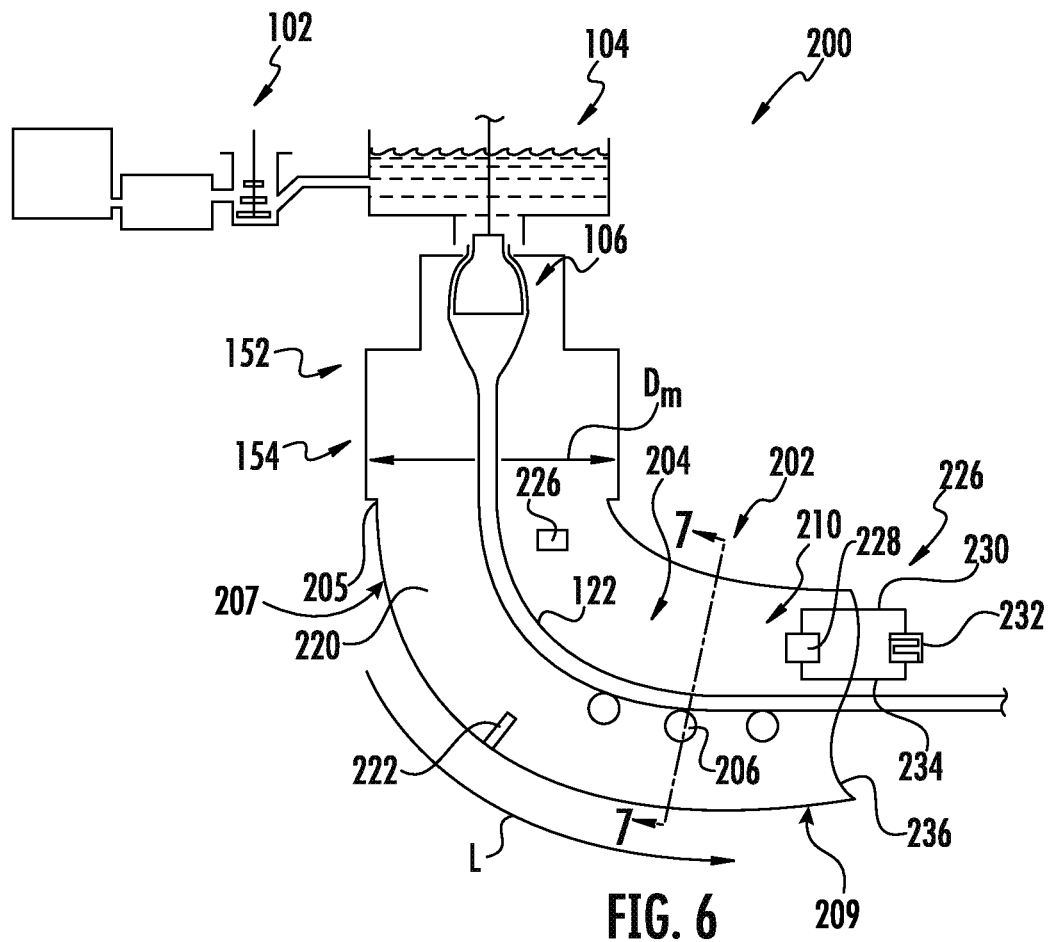
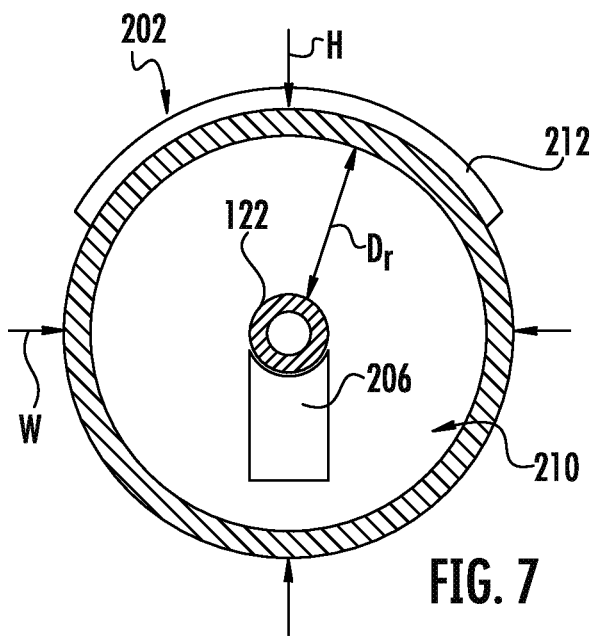
FIG. 6
FIG. 7

METHOD AND APPARATUS FOR CONTROLLING GLASS TUBE TAPER

CROSS-REFERENCE TO RELATED APPLICATIONS

This application claims the benefit of priority under 35 U.S.C. § 120 of U.S. Provisional Application No. 62/428,005, entitled "Methods and Apparatuses for Controlling Glass Tube Taper," filed Nov. 30, 2016, the entirety of which is hereby incorporated by reference.

BACKGROUND

Field

The embodiments described herein generally relate to apparatuses for forming glass tubing and, more specifically, to methods and apparatuses for controlling glass tube taper during glass tubing forming processes.

Technical Background

Use of glass tubing to produce glass articles, such as vials, cartridges, and syringes, requires a high level of dimensional stability in the glass tubing wall. For example, vials, cartridges and syringes have tight dimensional requirements that require minimum concentricity and wall thickness variation. Industry standards require that wall thickness variations be less than 5% of the product's overall wall thickness. However, dimensional variations in the glass tubing from which the glass articles are formed may result in glass articles with wall thicknesses that are outside of acceptable tolerances. Such dimensional variations may be a result of, for example, processes instabilities or variations in the glass tubing manufacturing process.

There are many factors that can affect tube outer diameter. Such factors can occur in the tube forming stage and result in significant tube outer diameter and thickness variations.

Accordingly, a need exists for alternative glass tubing forming apparatuses that reduce dimensional variations in the glass tubing formed therefrom.

SUMMARY

The embodiments described herein relate to glass tube forming apparatuses with enhanced thermal dimensional stability that provide reduced tube taper during the production of glass tubing. The apparatuses utilize lower extended muffle structures that manage convective air flow as the glass tubing flows from a vertical to a non-vertical or horizontal orientation during the glass forming process. Convection and ambient air flow can be more controlled in these different air flow regimes as the glass tubing is formed to the desired dimensions.

According to one embodiment, a glass tube manufacturing apparatus for manufacturing glass tubing includes a glass delivery tank with molten glass. The glass delivery tank has a bottom opening. A bell has an upper portion with an outer diameter located at the bottom opening. A heating apparatus is at least partially disposed around the bell. The heating apparatus includes a heated portion and a muffle portion located below the heated portion. A lower extended muffle structure extends downwardly from the muffle portion, the lower extended muffle structure extending about a periphery of the glass tubing to manage convective airflow therethrough.

According to another embodiment, a method for manufacturing glass tubing is provided. The method includes melting a glass composition in a glass delivery tank and producing molten glass. The glass delivery tank having a bottom opening with an inner diameter. The molten glass is drawn around a bell thereby forming a glass tube. The bell has an upper portion with an outer diameter. The glass tube forms in a space between the inner diameter of the bottom opening and the outer diameter of the bell. A heating apparatus is at least partially disposed around the bell. The heating apparatus includes a heated portion and a muffle portion located below the heated portion. The glass tube is directed through a lower extended muffle structure that extends downwardly from the muffle portion. The lower extended muffle structure extends about a periphery of the glass tubing to manage convective airflow therethrough.

According to another embodiment, a heating apparatus for a glass tube manufacturing apparatus for manufacturing glass tubing includes a heated portion comprising a heating element for heating molten glass as the molten glass is drawn around a b ell thereby forming a glass tube. A muffle portion receives the glass tube from the heated portion. A lower extended muffle structure extends downwardly from the muffle portion. The lower extended muffle structure extending about a periphery the glass tubing to manage convective airflow therethrough.

Additional features and advantages of the glass tubing forming apparatuses with enhanced thermal dimensional stability described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 4A illustrates an embodiment of a heating apparatus including a muffle portion and lower extended muffle portion with about the same diameter as the muffle portion according to one or more embodiments shown and described herein;

FIG. 4B illustrates an embodiment of a heating apparatus including a muffle portion and a lower extended muffle portion having a diameter less than a diameter of the muffle portion according to one or more embodiments shown and described herein;

FIG. 4C illustrates an embodiment of a heating apparatus including a muffle portion and a lower extended muffle portion having a diameter less than a diameter of the muffle portion according to one or more embodiments shown and described herein;

FIG. 4D illustrates an embodiment of a heating apparatus including a muffle portion and a lower extended muffle portion having a diameter less than a diameter of the muffle portion according to one or more embodiments shown and described herein;

FIG. 5 illustrates an embodiment of a multi-sided lower extended muffle structure according to one or more embodiments shown and described herein;

FIG. 6 illustrates a schematic diagram of another glass tubing manufacturing apparatus with a heating apparatus and lower extended muffle structure according to one or more embodiments shown and described herein;

FIG. 7 illustrates a section view of the lower extended muffle structure along line 7-7 of FIG. 6;

DETAILED DESCRIPTION

Figure 1:
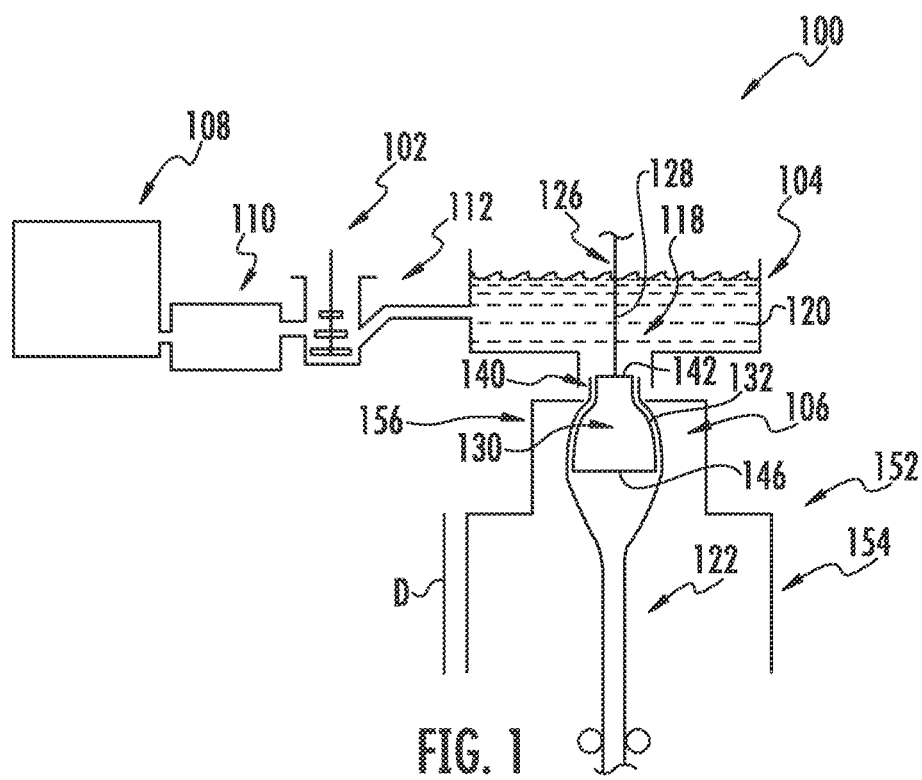
FIG. 1 is a schematic diagram of a glass tubing manufacturing apparatus with a heating apparatus according to one or more embodiments shown and described herein.

Reference will now be made in detail to various apparatuses and methods for forming glass tubing described herein, examples of which are illustrated in the accompanying drawings. Whenever possible, the same reference numerals will be used throughout the drawings to refer to the same or like parts.

Embodiments described herein relate to methods and apparatuses for controlling glass tube taper during glass forming processes. The apparatuses utilize a bell that is positioned below a tank of molten glass in order to form molten glass into glass tubing by directing the molten glass over an exterior of the bell and delivering a pressurized gas, such as air, through the bell to an interior of the molten glass to form an inner diameter. The bell is also positioned at least partially within a heating apparatus that delivers heat to the molten glass as the molten glass passes vertically therethrough. The heating apparatus includes a muffle portion that at least partially isolates the glass moving from the bell from the environment during glass tube formation. A lower extended muffle structure may be provided adjacent the muffle portion that at least partially surrounds the glass tube as it moves from the muffle portion of the heating apparatus. The lower extended muffle structure may continue to at least partially isolate the glass tube therein from the environment and manage convective airflow therethrough. The lower extended muffle structure may extend along and around the glass tubing as the glass tubing transitions from a vertical orientation to a non-vertical or horizontal orientation.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Without wishing to be bound by theory, there are many factors that can affect the outer diameter of glass tubing during the formation process. One process for manufacturing glass tubing is the Vello process. The Vello process forms a glass tube by flowing molten glass, using gravity, around a die (also referred to as a "bell head" or "bell") of a known diameter. Some factors that can affect the outer diameter of the glass tubing include inhomogeneity in the tank, air pressure variation in the bell, natural convection and ambient temperature fluctuation. Natural convection, for example, can induce glass flow instability around the tubing during the forming stage. This induced flow instability can result in glass temperature fluctuation, which can cause enhanced tube outer diameter and thickness variations along the length of the tubing. Such air flow instability can be particularly acute when the glass tubing flows in a non-axisymmetric fashion from a vertical orientation to a more horizontal orientation during the glass forming process.

As the air temperature varies around the glass tubing in the forming state inside the muffle portion, heat transfer from the glass tubing to the air varies, which can cause glass temperature fluctuations. Generally, the glass temperature can fluctuate more rapidly downstream of the bell and can peak in the middle of the muffle portion where there is active glass tube formation occurring. The effects of viscosity variation due to temperature fluctuations on glass tubing dimension (outer diameter) can be estimated. For extension tubing flow, the pulling force can be given as $$F = 3\mu(T)\frac{dU}{dZ}A,$$

where F is the pulling force along the glass tubing, $\mu(T)$ is the viscosity, $dU/dZ$ is the attenuation rate and A is the tube cross-sectional area. The pulling force F is kept constant during the tube forming process. When the glass viscosity fluctuates, the tube attenuation rate $dU/dZ$ varies if the cross-sectional area A does not change at the location of the disturbance. As a result, the diameter and thickness of the glass tubing varies in the downstream. Differences in tube outer diameter along a length of the glass tube may be referred to as taper.

The industry definition for calculating taper is the maximum of maximum cross sectional outer diameter minus the minimum of the maximum cross sectional outer diameter along a length of the glass tube (e.g., 1.6 m), such that out of round tube portions are not considered. In other words, for a round tube, taper is the maximum outside diameter minus the minimum outside diameter over a predetermined length. The lower extended muffle structure provides a barrier between the glass tube and the environment and is sized and configured to manage convective airflow therewithin, which can reduce taper along lengths of the glass tube as the glass tube is being formed.

Referring to FIG. 1, an exemplary glass tube manufacturing apparatus 100 for forming glass tubing in a continuous fashion is schematically depicted. The glass tube manufacturing system 100 generally includes molten glass delivery system 102, a delivery vessel 104 for receiving molten glass, and a bell 106. The molten glass delivery system 102 generally includes a melting vessel 108, a fining vessel 110, and a mixing vessel 112 coupled to the delivery vessel 104 of the glass tube manufacturing apparatus 100. The delivery vessel 104 may include heating elements (not shown) for heating and/or maintaining the glass in a molten state. The delivery vessel 104 may also contain mixing components for further homogenizing the molten glass in the delivery vessel 104. In some embodiments, the delivery vessel 104 may cool and condition the molten glass in order to increase the viscosity of the glass prior to providing the glass to the bell 106.

The delivery vessel 104 may include an opening 118 in the bottom thereof. In various embodiments, the opening 118 is circular, but may be oval, elliptical or polygonal, and is sized to permit molten glass 120 to flow through the opening 118 in the delivery vessel 104. The molten glass 120 may flow over the bell 106 directly from the opening 118 in the delivery vessel 104 to form glass tubing 122.

A bell support 126 is connected to the bell 106 that is part of the glass tube manufacturing apparatus. The bell support 126 can have a fluid supply channel 128, such as a pipe, conduit, or similar fluid delivery device, which is fluidly coupled to an internal chamber 130 of the bell 106. The fluid supply channel 128 may be operable to deliver a supply of pressurized fluid to the internal chamber 130. In some embodiments, the pressurized fluid may be a pressurized gas, specifically air or an inert pressurized gas, including, without limitation, nitrogen, helium, argon, krypton, xenon, and the like. The gas supports the interior of the glass tubing 122 after it flows past the bell 106 and no longer contacts a side wall 132 of the bell 106 as schematically depicted in FIG. 1. The glass tube manufacturing apparatus 100 includes the glass delivery vessel 104 for supplying molten glass to the bell 106.

Figure 1A:
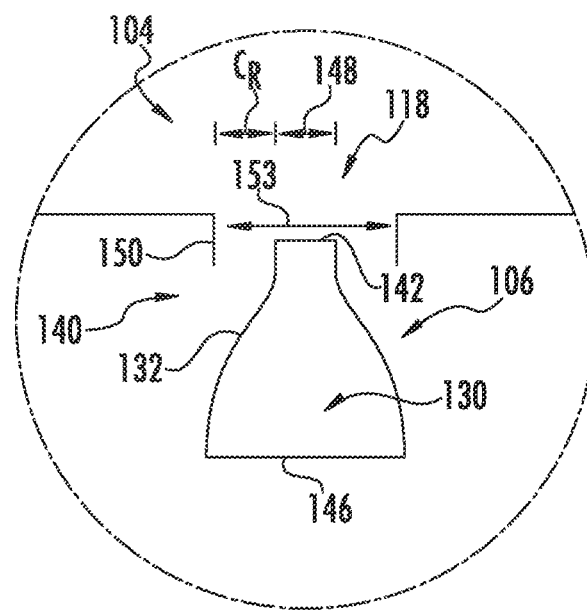
FIG. 1A is a schematic diagram of a bell region shown in FIG. 1 illustrating an enlarged view of a bell within a bottom opening of a glass delivery tank according to one or more embodiments shown and described herein.

The bell 106 can have a top portion 140 with a top surface 142 and the side wall 132. The side wall 132 and a bottom edge 146 define the internal chamber 130 of the bell 106. The top surface 142 of the top portion 140 has an outer diameter 148 (FIG. 1A). The bell 106 may have a variety of shapes including, without limitation, a substantially conical shape or, alternatively, a substantially parabolic shape. Accordingly, it should be understood that the bell 106 may be of any shape and/or configuration suitable for expanding and thinning a tube of heated glass (i.e., molten glass) drawn over the surface of the bell. The material from which the bell 106 is formed is stable at elevated temperatures such that the bell does not contaminate heated glass drawn over the bell 106. Examples of suitable bell materials include but are not limited to refractory metals and alloys thereof, platinum-group metals, stainless steels, nickel, nickel-based alloys and ceramics such as, for example, zircon ($ZrSiO_4$) and alumina ($Al_2O_3$).

Referring briefly to FIG. 1A, the glass delivery vessel 104 has the bottom opening 118 with a bottom portion 150 that has an inner diameter 153. The bottom portion 150 has a bottom edge. The outer diameter 148 of the top portion 140 can be less than the inner diameter 153 of the bottom opening 118. A clearance $C_R$ between the top portion 140 and the bottom opening 118 governs, at least in part, the wall thickness of the glass tube drawn over the bell 106. In addition, and as the bell 106 is bell-shaped or parabolically-shaped, the outer diameter of the bell 106 increases along the length of the bell 106 in a downward direction. The position of the top portion 140 of the bell 106 relative to the bottom opening 118 may be adjusted to provide uniform flow of the molten glass from the glass delivery vessel 104 through the bottom opening 118 and over the bell 106.

Referring again to FIG. 1, a heating apparatus 152 (e.g., a furnace) with heating elements may be disposed around the bell 106. In one embodiment, the heating apparatus 152 can include an infrared heating apparatus with infrared heating elements. However, it should b e understood that other types of heating elements may be used including, without limitation, focused infrared, resistive, induction and/or combinations thereof as understood by one of ordinary skill in the art. Further, it should be understood that, while FIG. 1 depicts the heating apparatus as being disposed around the bell 106, the heating apparatus 152 may b e integrated with the bell 106, such as when the heating apparatus 152 is a resistive heating apparatus.

An extended muffle portion 154 is part of the heating apparatus 152. The extended muffle portion 154 may extend about the glass tubing 122 on all sides, 360 degrees around the glass tubing 122 and downwardly from a heated portion 156 of the heating apparatus 152 that contains the heating elements. The lower extended muffle portion 154 may extend below the heated portion 156 a predetermined distance D (e.g., about 80 mm or more, such as about 100 mm or more, such as about 200 mm or more, such as ab out 300 mm or more, such as about 400 mm or more, such as about 500 mm or more, such as ab out 600 mm or more, such as about 700 mm or more, such as about 800 mm or more, such as between about 100 mm and about 1.5 m, such as between about 500 mm and about 1 m). In some embodiments, to a lower extended muffle structure may be connected to the muffle portion and extend the predetermined distance, as will be described in greater detail below.

Example

Figure 2A:
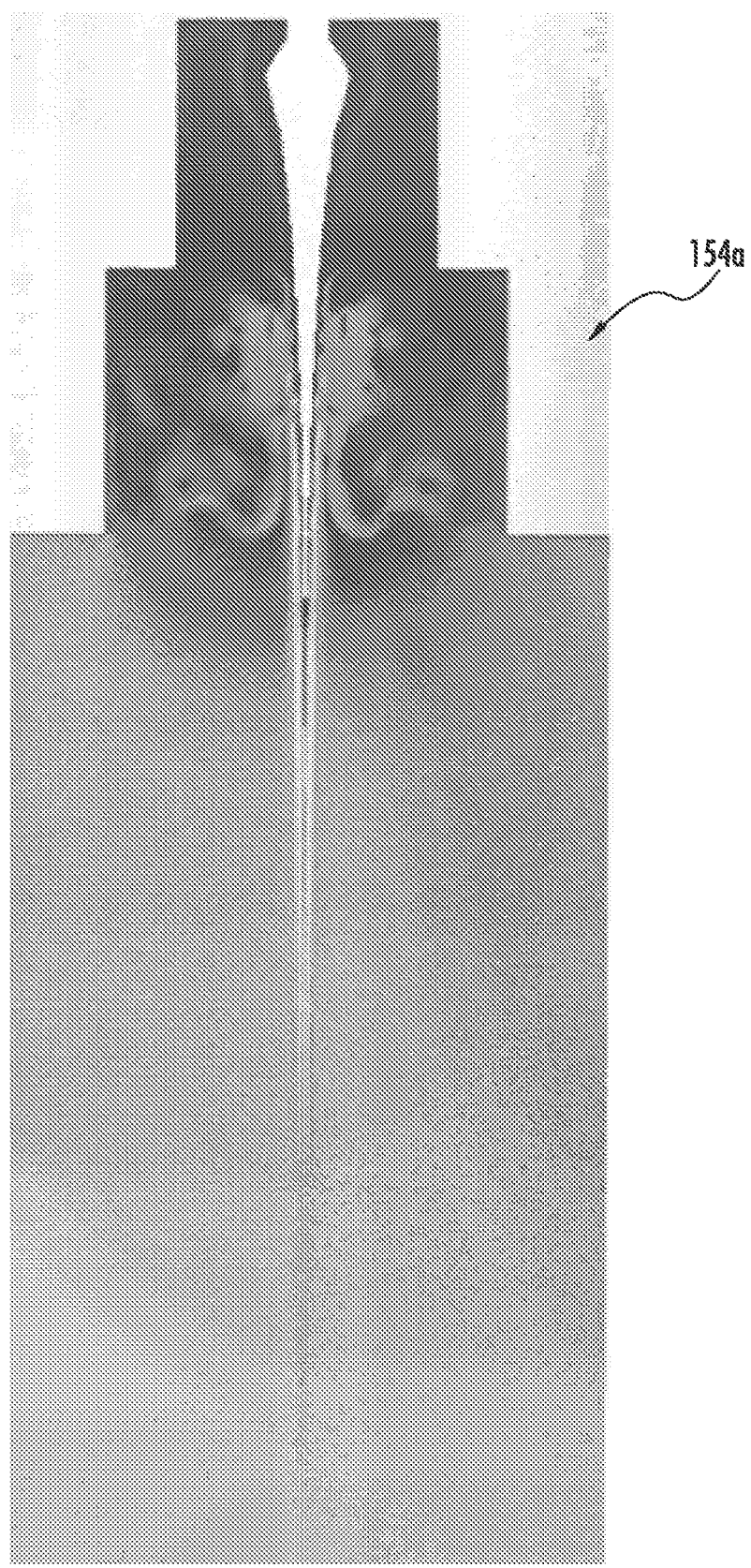
FIG. 2A illustrates an embodiment of a heating apparatus including a muffle portion according to one or more embodiments shown and described herein.

A model was built to test use of an extended muffle portion 154 on glass tubing taper. The model was based on the commercially available computation fluid dynamics (CFD) software ANSYS Fluent from ANSYS, Inc. The model is a 2D axisymmetric model that considers the glass tube flow in the presence of natural convection, radiative heat transfer and gravity. The model domain is illustrated by FIG. 2A. The draw height was assumed to be 1.6 m. The geometry and velocity fields of the glass domain were fixed and obtained from a 2D COMSOL model from COMSOL Inc. The model did not consider glass forming and focused on capturing the thermal interactions and the resulting flow patterns inside the lower extended muffle structure.

The glass inlet temperature in the lower extend muffle portion 154 was specified to be 1220 degrees C. and the outlet from the lower extended muffle portion 154 was assumed to be adiabatic. The inner surface of the glass tubing was also assumed to be adiabatic. The outer surface heat transfer of the glass tubing varies in response to thermal interactions and was calculated by the model. Isothermal (constant temperature) boundary conditions were prescribed on the walls of the lower extended muffle portion 154 to reflect actual temperature measurements.

Figure 2B:
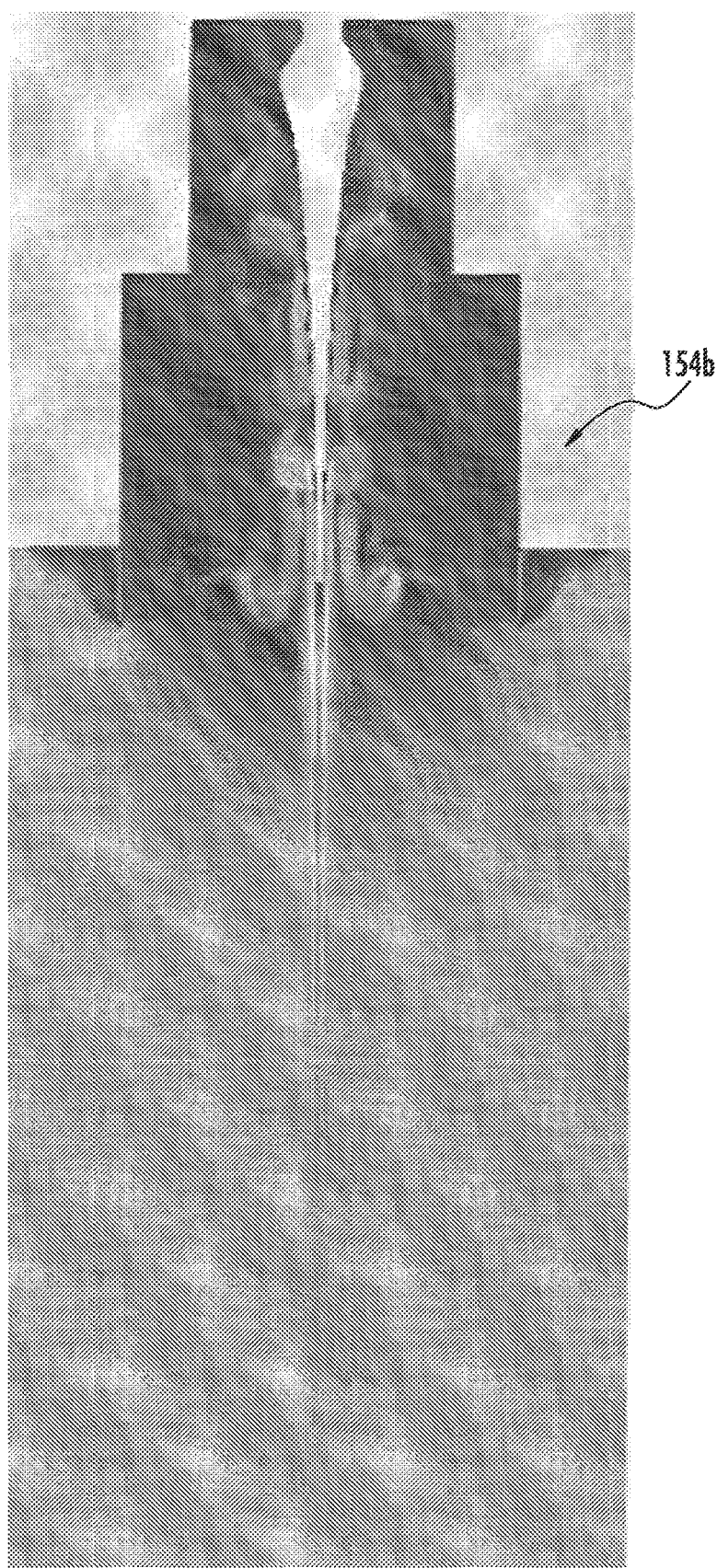
FIG. 2B illustrates an embodiment of a heating apparatus including a muffle portion and a lower extended muffle portion that extends downwardly below the muffle portion according to one or more embodiments shown and described herein.
Figure 2C:
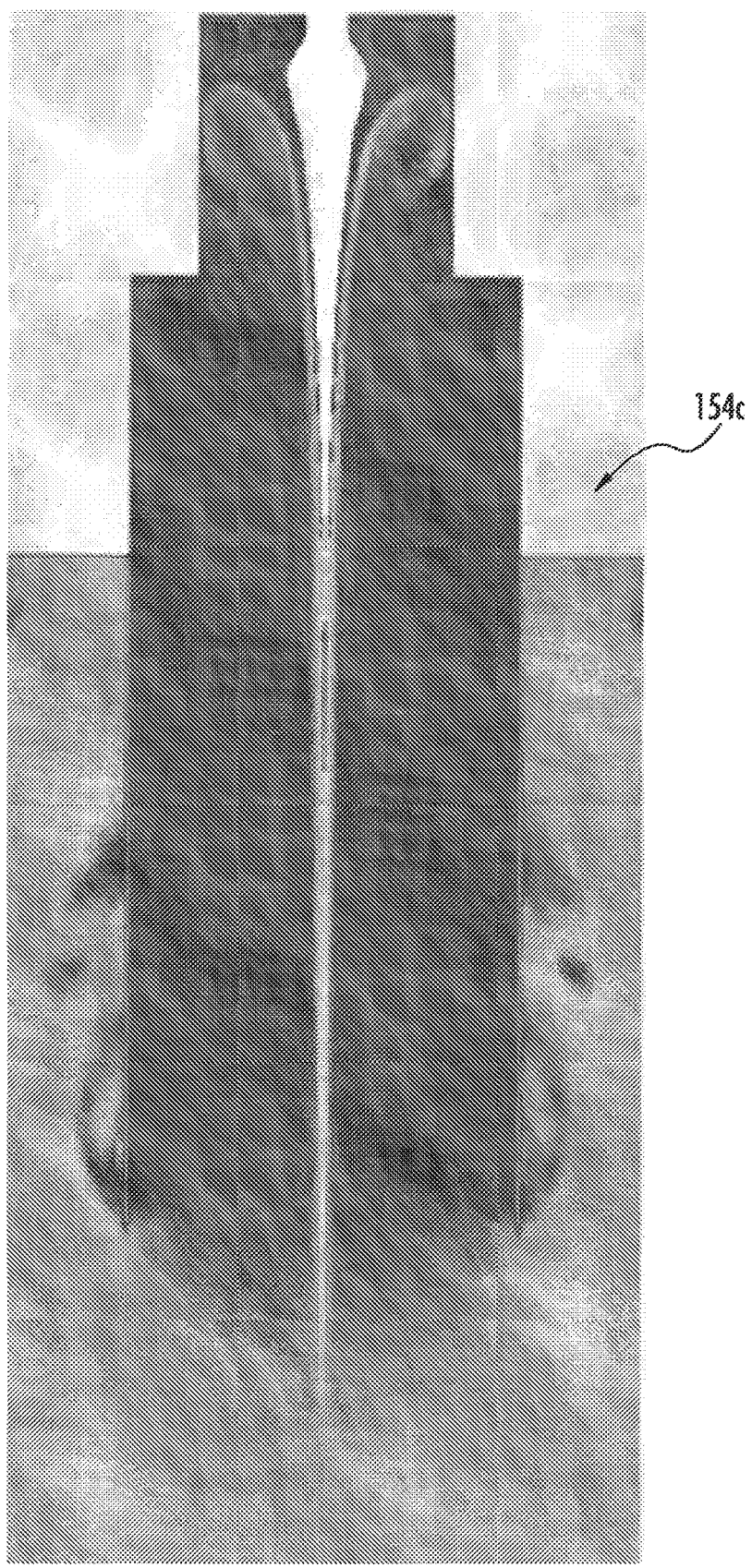
FIG. 2C illustrates an embodiment of a heating apparatus including a muffle portion and a lower extended muffle portion that extends downwardly below the muffle portion according to one or more embodiments shown and described herein.

FIGS. 2A-C illustrate the affect that the length of the extended muffle portion 154 can have on convective air flow. For cases (A) and (B) having relatively short muffle portions 154a and 154b, significant instabilities in their air flow patterns are seen in the muffle portions 154a and 154b. These unstable air flow patterns are characterized by the random and chaotic formations to toroidal vortices, which result in spurious temperature variations on the surface of the glass tubing and can adversely affect tube quality. This convective air flow pattern is similar to Rayleigh-Benard convection where there is a critical layer dimension for which the convection pattern becomes unconditionally unstable. One key difference here, however, is the effect of radiation which is typically not considered in Rayleigh-Benard convection and can have a significant effect on the stability of the air flow regime. Case (C) having a relatively long muffle portion 154c has a more stable air flow pattern compared to cases (A) and (B) that provides lower temperature fluctuations on the surface of the glass tubing as it cools and travels through the muffle portion 154c.

Figure 3:
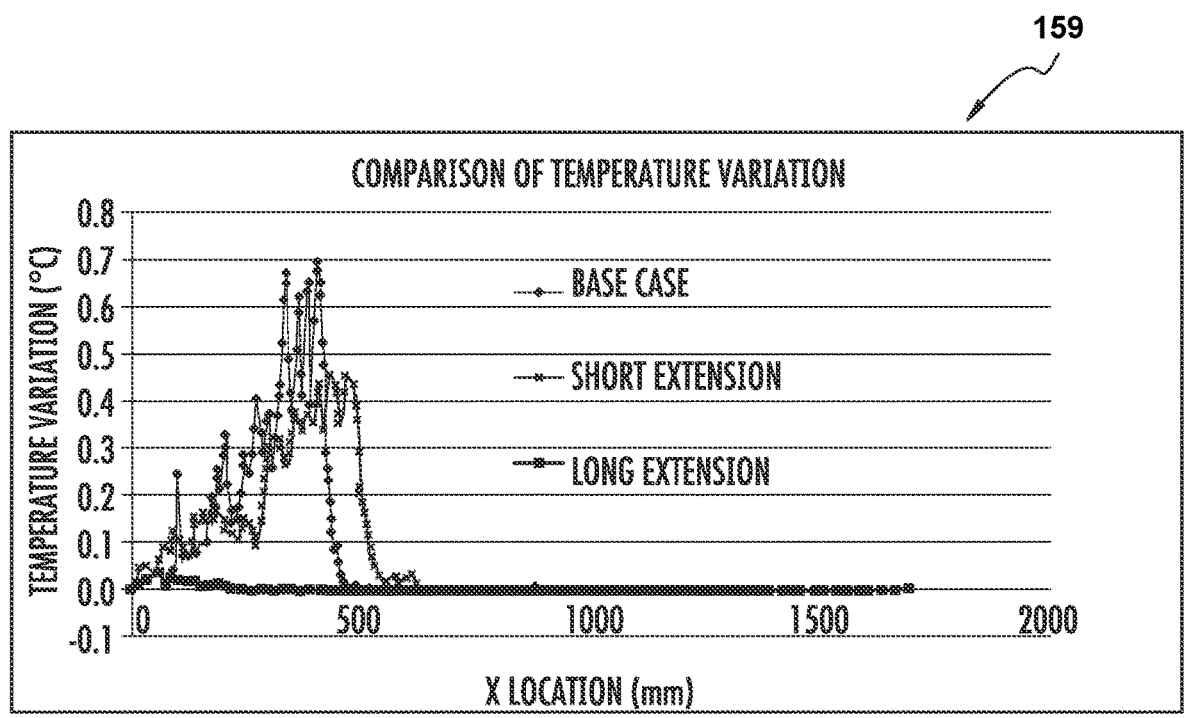
FIG. 3 is a plot of temperature variation versus draw height location X for each of FIG. 2A, FIG. 2B and FIG. 2C.

Referring to FIG. 3, a plot 159 of temperature variation versus draw height location X is illustrated for each of the cases (A), (B) and (C) of FIGS. 2A-C. X location is the distance from the bell, where the glass temperature is kept constant and does not change with time. Such glass temperature variation at locations X is measured over time. As can be seen, the longer muffle portion 154c has a more stable glass temperature profile over distances X from the bell (less than 0.1° C.) than that of the shorter muffle portions 154a and 154b. Indeed, the longer muffle portion 154c has a temperature variation of less than about 0.5 degree C., such as less than 0.1 degree C., while shorter muffle portion 154a has a temperature variation of more than 0.5 degree C.

FIGS. 4A-D illustrate the affect that the width or diameter of the lower extended muffle structure can have on convective air flow. For FIGS. 4A and 4B having relatively wide lower extended muffle portions 354a and 354b (e.g., 18 inches and 10 inches in diameter, respectively), there tends to be some toroidal flow. For example, FIG. 4A shows toroidal flow below the bell, near a beginning of the glass tubing formation, while FIG. 4B shows toroidal flow within the lower extended muffle portion 354b. In either case, the increased turbulence can cause temperature variations along lengths of the glass tubing. Compare FIGS. 4C and 4D, which illustrate relatively narrow muffle portions 354c and 354d (e.g., 5 inches and 2 inches, respectively). The lower extended muffle structures 354c and 354d tend to produce less toroidal flow compared to the lower extended muffle portions 354a and 345b due to their narrowed, elongated dimensions controlling convective air flow within the flow control structures 354c and 354d, which can reduce temperature fluctuation along lengths of the glass tubing.

Referring to FIG. 5, an exemplary lower extended muffle structure 164 is illustrated that encloses a portion of a length of glass tubing flowing from a heating apparatus. The lower extended muffle structure 164 is generally a five-sided structure having a top wall 166 and four side walls 169, 170, 172 and 174 that surround the glass tubing on all sides as the glass tubing exits the heating apparatus. In some embodiments, the lower extended muffle structure 164 may be connected at the top wall 166 to a muffle portion of the heating apparatus and located therebelow to extend the enclosure provided by the muffle portion alone. One side wall 169 may be slanted to accommodate providing a catenary for the glass tubing to change the orientation of the glass tubing from vertical to horizontal and also to isolate upstream portion of the glass tubing from perturbations generated during the drawing process or other downstream processes, such as glass tube cutting. The lower extended muffle structure 164 may be formed of any suitable high-temperature material or combination of materials, such as metals, metal alloys, ceramics, glass, etc.

Referring to FIG. 6, another embodiment of a glass tube manufacturing apparatus 200 includes many of the components described above with reference to FIG. 1 including molten glass delivery system 102, delivery vessel 104, bell 106 and heating apparatus 152 including muffle portion 154. In this embodiment, a lower extended muffle structure 202 is in the form of a flexible enclosure (e.g., a cylinder or tube) that is connected to the muffle portion 154 of the heating apparatus 152. The lower extended muffle structure 202 may be a thermally engineered device (TED) that is formed of any suitable material, such as metals (e.g., steel, aluminum alloys), fabrics, such as high temperature weaves of Kevlar, alumina, silica and ceramic fibers.

As above, the lower extended muffle structure 202 extends downward from the heating apparatus 152. The lower extended muffle structure 202 may be sealingly connected to the muffle portion 154 of the heating apparatus 152. A seal 205 may be formed between the lower extended muffle structure 202 and the heating apparatus 152 to inhibit entry of air therebetween. The lower extended muffle structure 202 may extend about the glass tubing 122 on all sides, 360 degrees around the glass tubing 122 and downwardly from the muffle portion 154. The lower extended muffle structure 202 may extend below the heating portion 156 and along a length of the glass tubing 122 a predetermined length L. With the flexibility of the lower extended muffle structure 202, the shape of the lower extended muffle structure 202 can be adjusted to follow and enclose the desired flow path of the glass tubing 122. As can be seen by FIG. 6, the glass tubing 122 hangs in a catenary 204 and is drawn over one or more pull rollers 206 as the glass tubing 122 shifts from a substantially vertical orientation within a vertically extending portion 207 of the lower extended muffle structure 202 to a substantially horizontal orientation within a horizontally extending portion 209 of the lower extended muffle structure 202 as the glass tubing 122 travels along the flow path.

The lower extended muffle structure 202 may be any suitable cross-sectional shape, such as circular or other suitable rounded shape, such as oval or other suitable shapes such as triangular or rectangular that enclose the glass tubing 122 on all sides. The length (or distance D) of the lower extended muffle structure 202 may be selected based on various factors, such as length of the glass tubing when sectioned or other suitable factor. As an example, the length of the lower extended muffle structure may be between about 100 mm to about 1.5 m, such as between about 0.5 m to about 1 m in length.

Referring to FIG. 7, a cross-section view of the lower extended muffle structure 202 with the glass tubing 122 is illustrated. As can be seen, the glass tubing 122 travels through the hollow opening 210 through the lower extended muffle structure 202. The lower extended muffle structure 202 may use any number of support structures 212 that can be used to support the lower extended muffle structure 202 in a desired shape and location. For example, the support structure 212 may include an arch-shaped or otherwise rounded support 212 that can support the lower extended muffle structure 202 in a rounded cross-sectional shape spaced-apart from the glass tubing 122. Rollers 206 may also be located in the lower extended muffle structure 202 and be used to draw the glass tubing 122 through the lower extended muffle structure 202 and along the flow path.

The lower extended muffle structure 202 has a width W and a height H, which, in the case of a substantially circular cross-section, are a diameter. In some embodiments, the width W and/or height H may be substantially equal to the width and/or height of the muffle portion 154. A maximum distance $D_r$ from the glass tubing 122 to the lower extended muffle structure 202 is less than the width W and/or height H of the lower extended muffle structure 202. As examples, the width W and/or height H of the lower extended muffle structure 202 may be about the same as an exit diameter $D_m$ of the muffle portion 154 (FIG. 6). For example, the exit diameter $D_m$ and the width W and/or height H may be about 18 inches and the maximum distance $D_r$ may be about 15 inches. In another embodiment, the width W and/or height H may be between about 10 inches and exit diameter $D_m$ about 18 inches and the distance $D_r$ may be about 7 inches. In another embodiment, the width W and/or height H may be between about 5 inches and about ten inches and $D_r$ may be about 2 inches.

The lower extended muffle structure 202 may include a number of features that can facilitate glass tube removal from the lower extended muffle structure 202, if needed, and glass tubing formation. For example, referring back to FIG. 6, the lower extended muffle structure 202 may include an openable portion 222, such as a reclosable opening that is formed within an outer wall 220 and can be closed using any suitable reclosable fastener or plug. In some embodiments, the lower extended muffle structure 202 may include a releasable seal that is connected to the muffle portion 154, such as a spring loaded and/or magnetic seal. As another example, the outer wall 220 may include a burn through section or otherwise separable portion that can be readily removed (e.g., chemically, mechanically, thermally, etc.) under certain conditions. Providing internal access from the outside of the lower extended muffle structure 202 can facilitate removal of glass tubing in case of a line break or other event where removal of glass tubing or general access to the interior of the lower extended muffle structure 202 is desired.

Stabilizing convective air currents in the lower extended muffle structure 202 may increase air temperature therein compared to not stabilizing convective air currents using the lower extended muffle structure 202, which can impact glass tubing attributes. FIG. 6 also shows an embodiment of the glass tube manufacturing apparatus 200 that includes a cooling system 226 that can be used to cool the lower extended muffle structure 202 and the hollow opening 210 thereby removing heat from the glass tubing 122 in a predetermined fashion. For example, the cooling system 226 may be a multiphase cooling system that takes advantage of a phase change (from liquid to vapor) thus harnessing latent heat of vaporization. The cooling system 226 may include an evaporator component 228 where liquid is converted to vapor by absorbing heat from the lower extended muffle structure 202, a vapor conduit 230 that directs the vapor to a condenser component 232 that condenses the vapor back to a liquid and a liquid conduit 234 that carries the liquid back to the evaporator component 228 to repeat the cycle. Other cooling systems may be used, such as recirculating water and forced air cooling. Further, the hollow opening 210 may be filled with gasses other than air, such as nitrogen, helium and argon. Ports may be provided at the interface between the lower extended muffle structure 202 and the muffle portion 154, at an end exit 236 of the lower extended muffle structure 202 or both. The outer wall 220 of the lower extended muffle structure 202 may be a single-piece or multiple-section design (e.g., a clamshell).

Figure 8D:
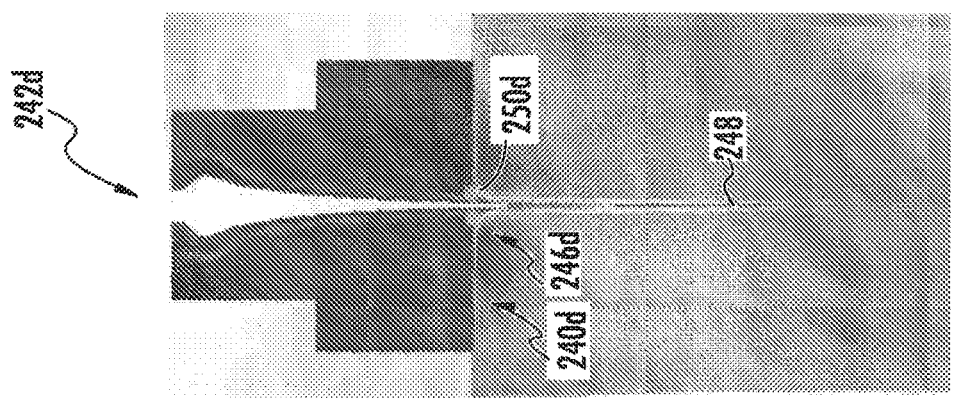
FIG. 8D illustrates an embodiment of a heating apparatus including a muffle portion and a muffle bottom cover having an opening with a diameter less than a diameter of the muffle portion according to one or more embodiments shown and described herein.
Figure 8C:
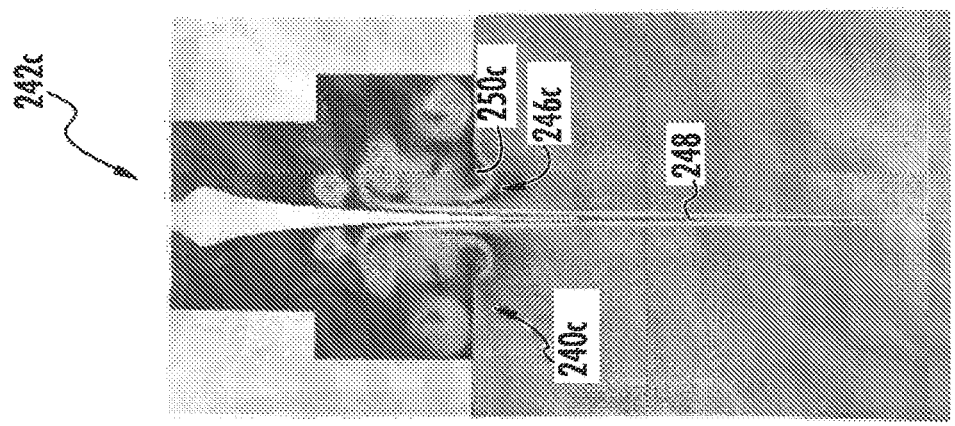
FIG. 8C illustrates an embodiment of a heating apparatus including a muffle portion and a muffle bottom cover having an opening with a diameter less than a diameter of the muffle portion according to one or more embodiments shown and described herein.
Figure 8B:
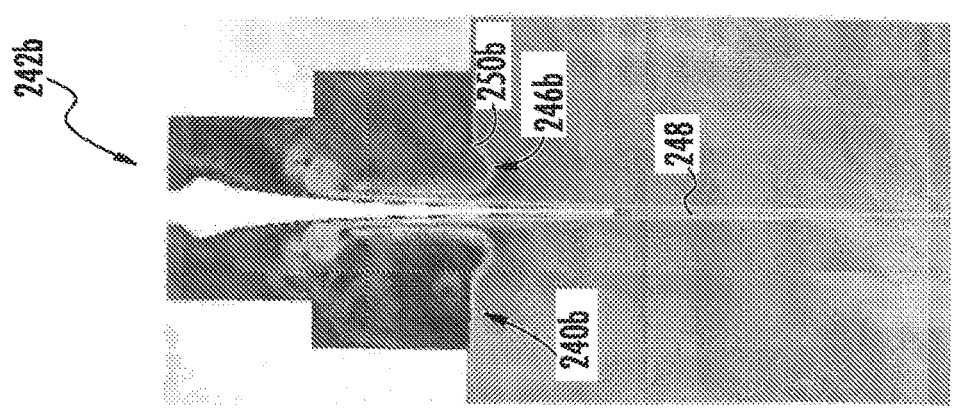
FIG. 8B illustrates an embodiment of a heating apparatus including a muffle portion and a muffle bottom cover having an opening with a diameter less than a diameter of the muffle portion according to one or more embodiments shown and described herein.
Figure 8A:
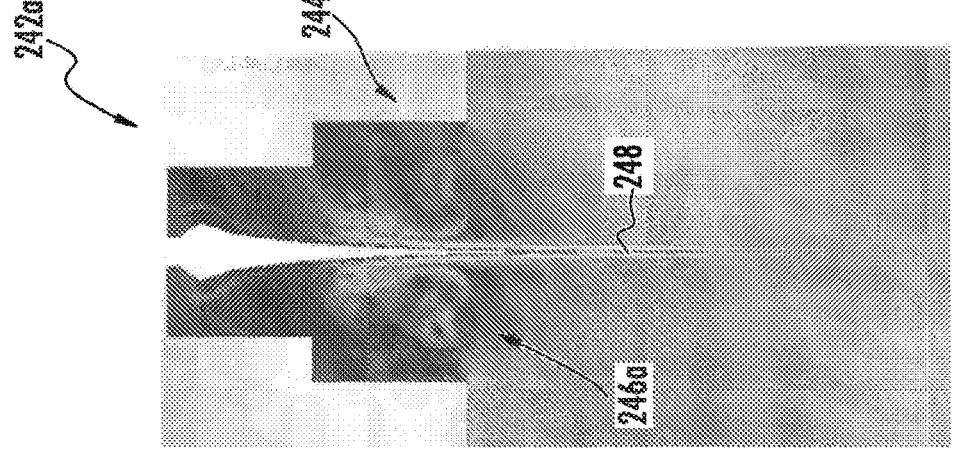
FIG. 8A illustrates an embodiment of a heating apparatus including a muffle portion according to one or more embodiments shown and described herein.

Referring to FIGS. 8A-D, while length of the lower extended muffle structure can affect convection air flow stability, a muffle bottom cover 240 with reduced diameter opening can also suppress natural convection induced flow instability. FIG. 8A illustrates a heating apparatus 242a with a muffle portion 244a without a muffle bottom cover. As an example, an exit opening 246a of the muffle portion 244a may be about 18 inches. As can be seen, various unstable air flow patterns are present, which result in spurious temperature variations on the surface of the glass tubing and can adversely affect tube quality. FIGS. (B) and (C) illustrate some improvement in convection air flow stability through use of muffle bottom covers 240b and 240c having openings 246b and 246c. For example, opening 246b may be about 9 in and opening 246c may be about 6 in thereby reducing distances between the glass tubing 248 and a perimeter 250b and 250c of the muffle bottom covers 240b and 240c. FIG. (D) shows the greatest convection air flow stability and has the smallest opening 246d. For example, the opening 246d of the muffle bottom cover 240d may be about 3 in.

Figure 9:
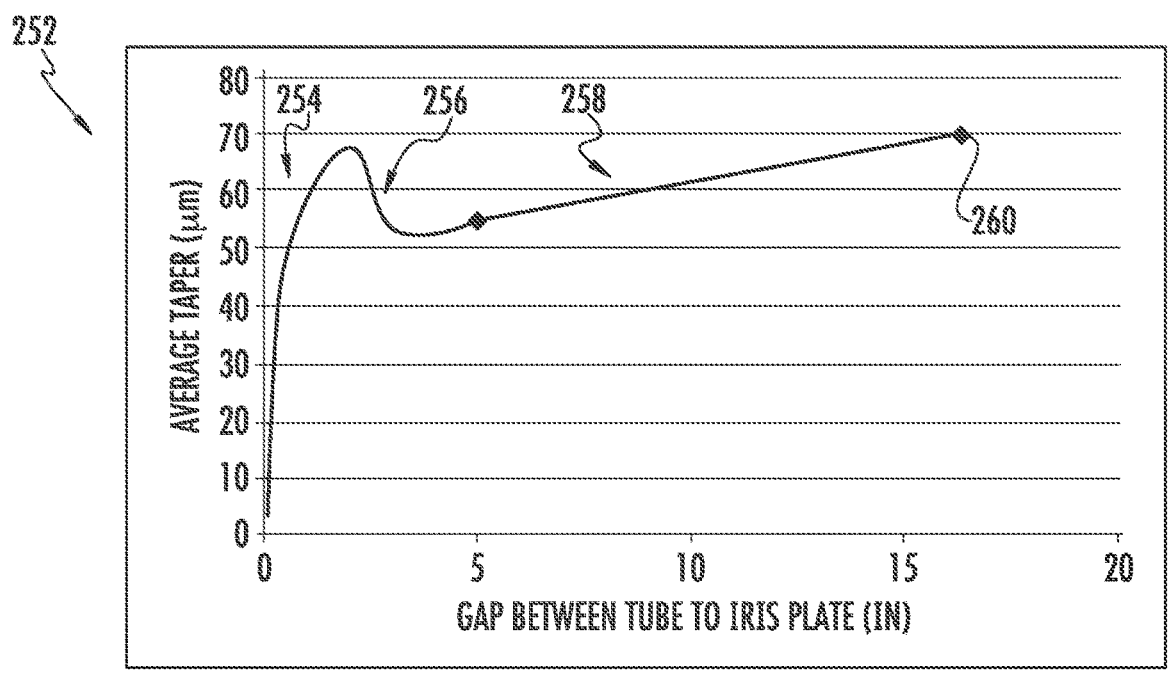
FIG. 9 illustrates a plot of average glass tube taper versus gap between the glass tubing and perimeter of an opening of a muffle bottom cover according to one or more embodiments shown and described herein.

FIG. 9 shows a plot 252 of average glass tube taper versus gap between the glass tubing and perimeter of the opening of the muffle bottom cover. As can be seen, the plot 252 illustrates a non-monotonic effect of opening hole size of the muffle bottom cover on tube diameter taper by increasing in tube taper in section 254, decreasing in section 256 and then again increasing in section 258 until point 260 with no muffle bottom cover.

Figure 10:
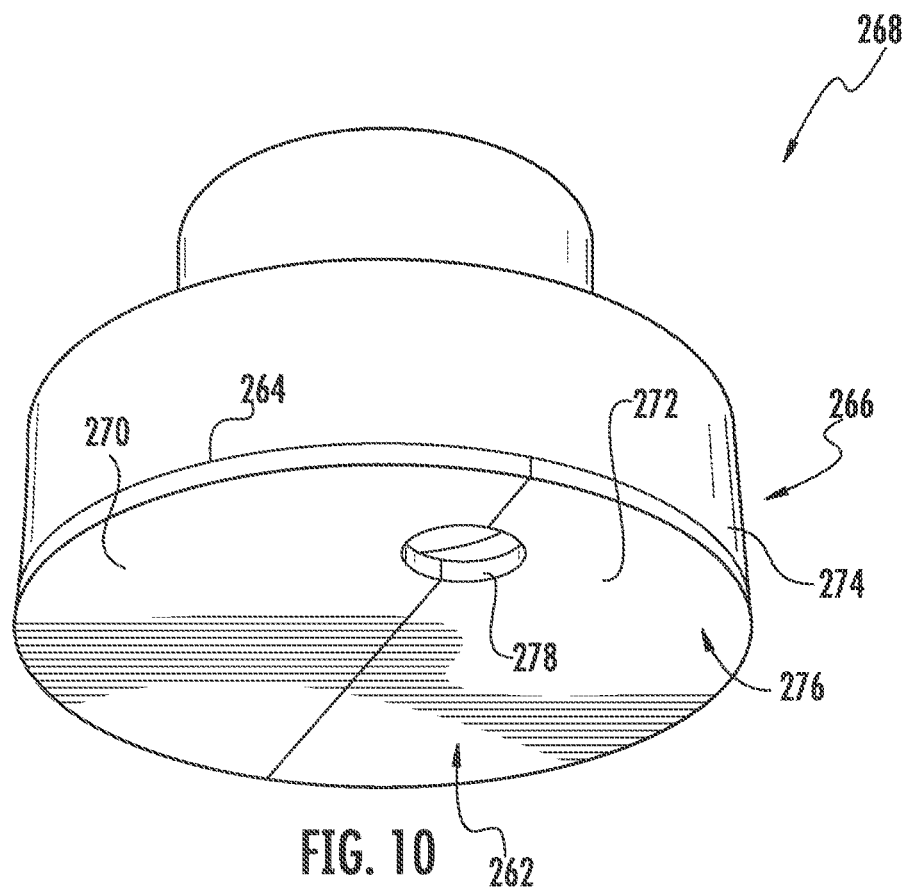
FIG. 10 is a bottom perspective view of a heating apparatus including a muffle bottom cover according to one or more embodiments shown and described herein.
Figure 11:
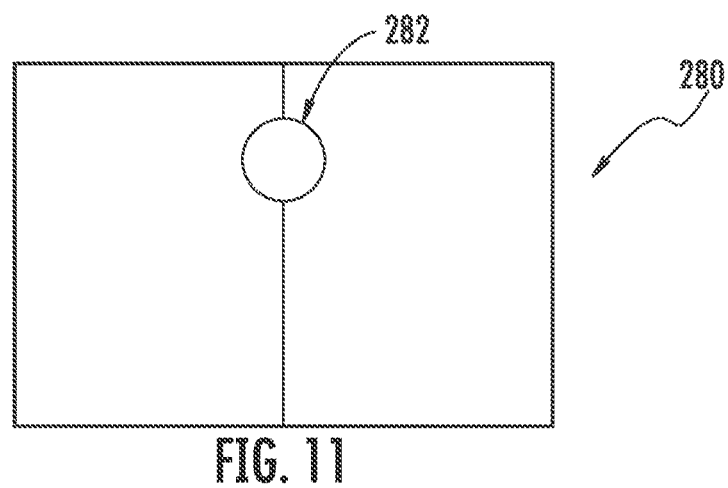
FIG. 11 is a bottom view of a rectangular-shaped muffle bottom cover according to one or more embodiments shown and described herein.

Referring to FIG. 10, an embodiment of a muffle bottom cover 262 is illustrated connected to a bottom 264 of a muffle portion 266 of a heating apparatus 268. The muffle bottom cover 262 may be provided with multiple sections 270 and 272, which may or may not be symmetric, each including a portion of an opening 278. Providing multiple sections 270 and 272 for the muffle bottom cover 262 can facilitate opening and closing of the muffle bottom cover 262 during the tube forming process, if needed. The muffle bottom cover 262 may be plate-like or planar in shape and extend to a periphery 274 of the muffle portion 266 thereby covering an entire exit opening 276 of the muffle portion 266. In other embodiments, the muffle bottom cover may be a single plate-like section. While the muffle bottom cover 262 is round or circular to correspond to the shape of the muffle portion 266, other shapes may be used for the muffle bottom cover, such as rectangular, as shown by muffle bottom cover 280 of FIG. 11. Other shapes can also be used for the openings 278, 282, such as other round shapes (e.g., elliptic), rectangular shapes or irregular shapes. The muffle bottom covers can be formed of any suitable material and can perform as radiation shields, for example, using opaque quartz to reduce loss of heat to the environment.

Figure 12:
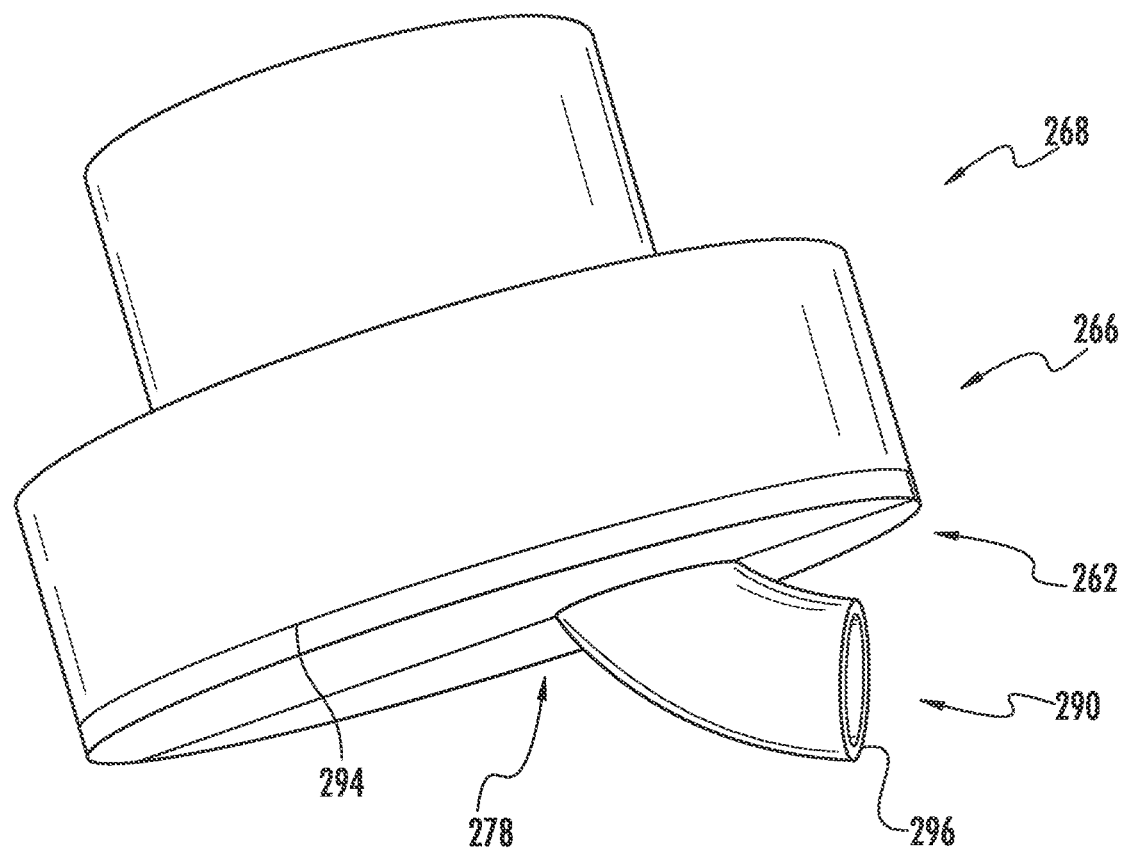
FIG. 12 is a side perspective of a heating apparatus including muffle bottom cover and a lower extended muffle structure according to one or more embodiments shown and described herein.

Referring to FIG. 12, in another embodiment, the heating apparatus 268 includes the muffle portion 266 including the muffle bottom cover 262 connected thereto. In this embodiment, a lower extended muffle structure 290 in the form of a tube having an outer diameter that is sized to extend through the opening 278, thereby extending the muffle portion 266. The lower extended muffle structure 290 may extend outwardly into the muffle portion 266 and also outwardly from an opposite side of the muffle portion 266 to an end 296. The lower extended muffle structure 290 may be curved to match or accommodate the catenary path of the glass tubing as the glass tubing exits the heating apparatus 268. The lower extended muffle structure 290 may be circular, elliptic or any other suitable cross-sectional shape.

Figure 13:
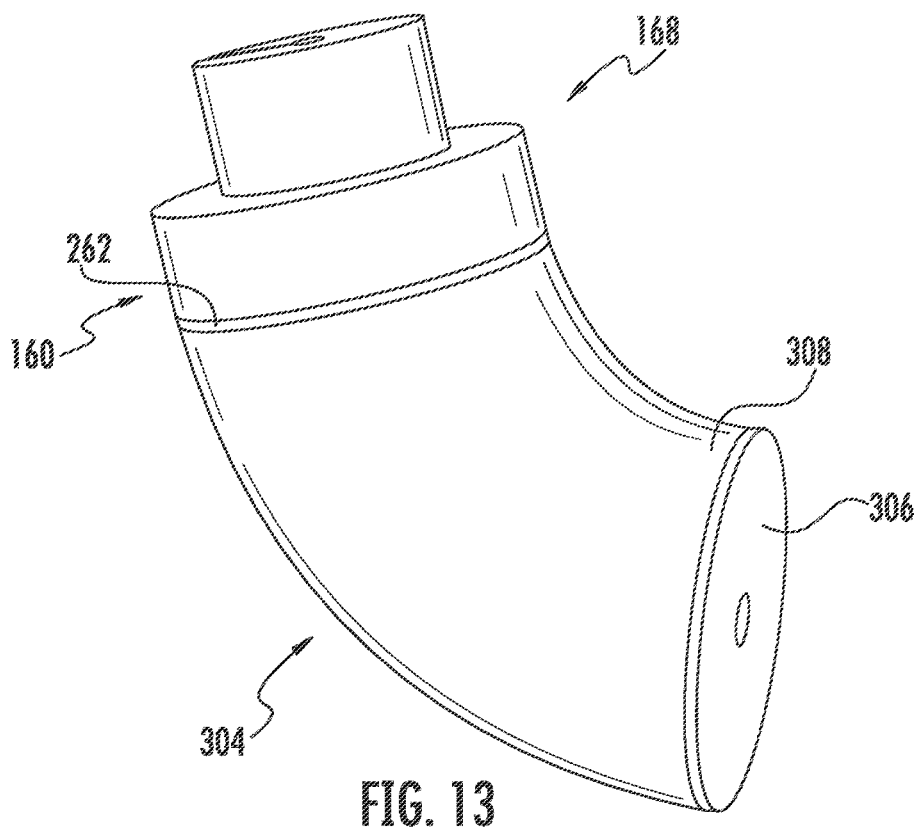
FIG. 13 is a side perspective of a heating apparatus including muffle bottom cover and a lower extended muffle structure with a lower extended muffle structure cover plate according to one or more embodiments shown and described herein.
Figure 14:
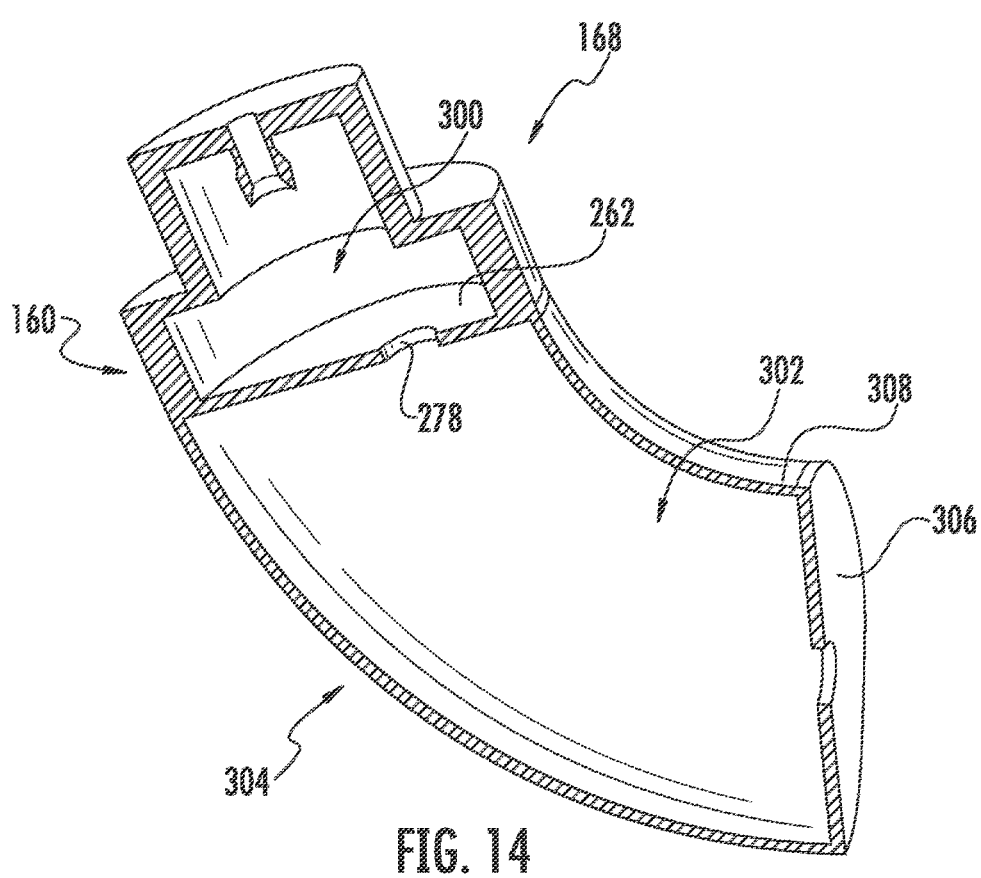
FIG. 14 is a side section view of the heating apparatus of FIG. 13.

FIGS. 13 and 14 illustrate the heating apparatus 268 and the muffle bottom cover 262 connected to the muffle portion 160 of the heating apparatus 268. Again, referring to FIG. 14, the muffle bottom cover 262 includes the opening 278 that, in the illustrated embodiment, provides communication between an interior 300 of the muffle portion 160 and an interior 302 of a lower extended muffle structure 304. In contrast to the lower extended muffle structure 290, the opening 278 is located within the interior 302 of the lower extended muffle structure 304. The lower extended muffle structure 304 may be curved to match or accommodate the catenary path of the glass tubing as the glass tubing exits the heating apparatus 268. A lower extended muffle structure cover plate 306 may be used to cover a lower end 308 of the lower extended muffle structure 304. In other embodiments, a lower extended muffle structure cover plate may not be used. Additionally, the lower extended muffle structure 304 may be flexible and include any number of curved and straight sections. Further, temperature control devices (heating and/or cooling) may or may not be provided within the interior 302 of the lower extended muffle structure 304. These temperature control devices can actively control the energy balance of the glass tubing to adjust the catenary length as process conditions change.

Figure 15:
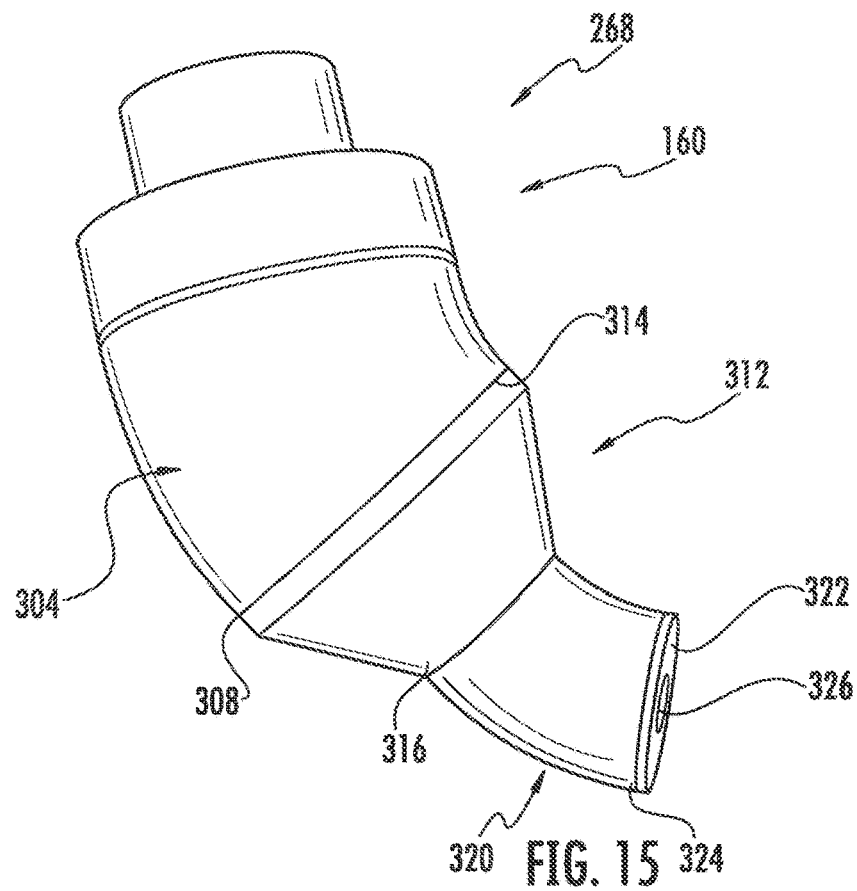
FIG. 15 is a side perspective view of a heating apparatus including lower extending muffle structures and cover plates according to one or more embodiments shown and described herein.
Figure 16:
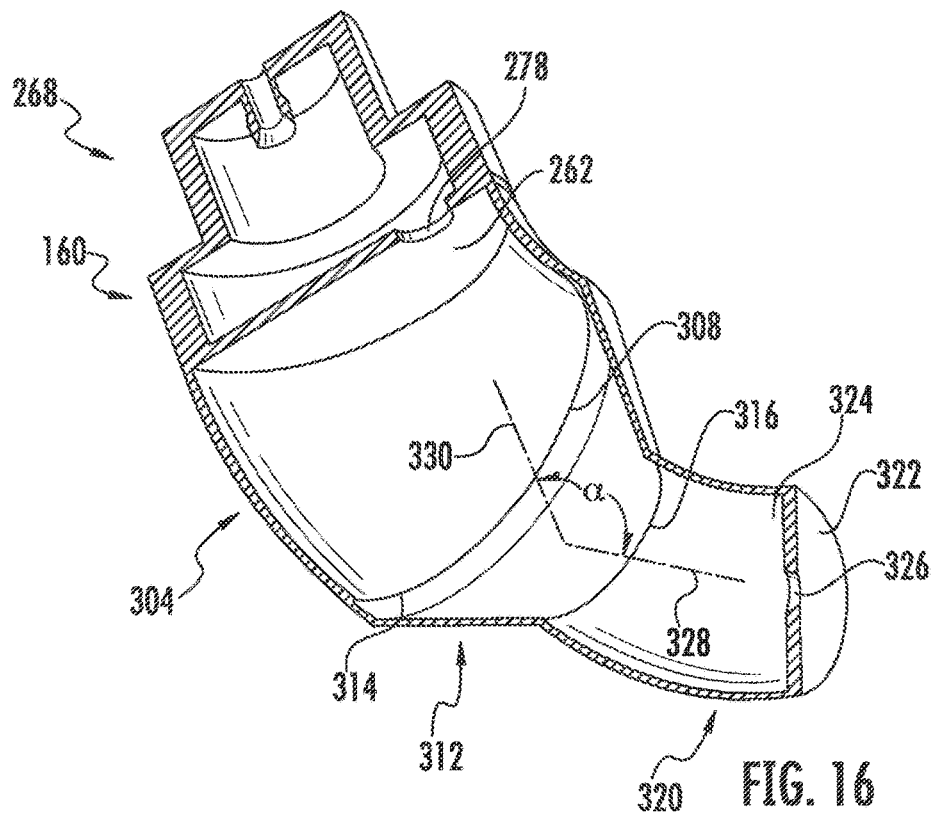
FIG. 16 is a side section view of the heating apparatus of FIG. 15 including the lower extending muffle structures and cover plates.

FIGS. 15 and 16 illustrate another variation of the heating apparatus 268 and the muffle bottom cover 262 connected to the muffle portion 160 of the heating apparatus 268 that includes the lower extended muffle structure 304 connected thereto as in FIGS. 13 and 14. In this example, a tapering lower extended muffle structure 312 is connected to the lower end 308 of the lower extended muffle structure 304. The tapering lower extended muffle structure 312 may taper in dimension (e.g., inner diameter) from a top end 314 that is connected to the lower end 308 of the lower extended muffle structure 304 to a lower end 316, forming a somewhat truncated cone shape. Another lower extended muffle structure 320 is illustrated connected to the lower end 316 of the tapering lower extended muffle structure 312. Again, the lower extended muffle structures 304 and 320 may be curved to match or accommodate the catenary path of the glass tubing as the glass tubing exits the heating apparatus 168. A lower extended muffle structure cover plate 322 may be used to cover a lower end 324 of the lower extended muffle structure 320. The lower extended muffle structure cover plate 322 may also include an opening 326 having a central axis 328 therethrough that is at an angle α (e.g., between about 175 degrees and about 90 degrees) to a central axis 330 of the opening 278 of the muffle bottom cover 262. As above, the lower extended muffle structure cover plate 322 may manage air entrainment into the lower extended muffle structure 320 through the lower end 324.

Figure 17:
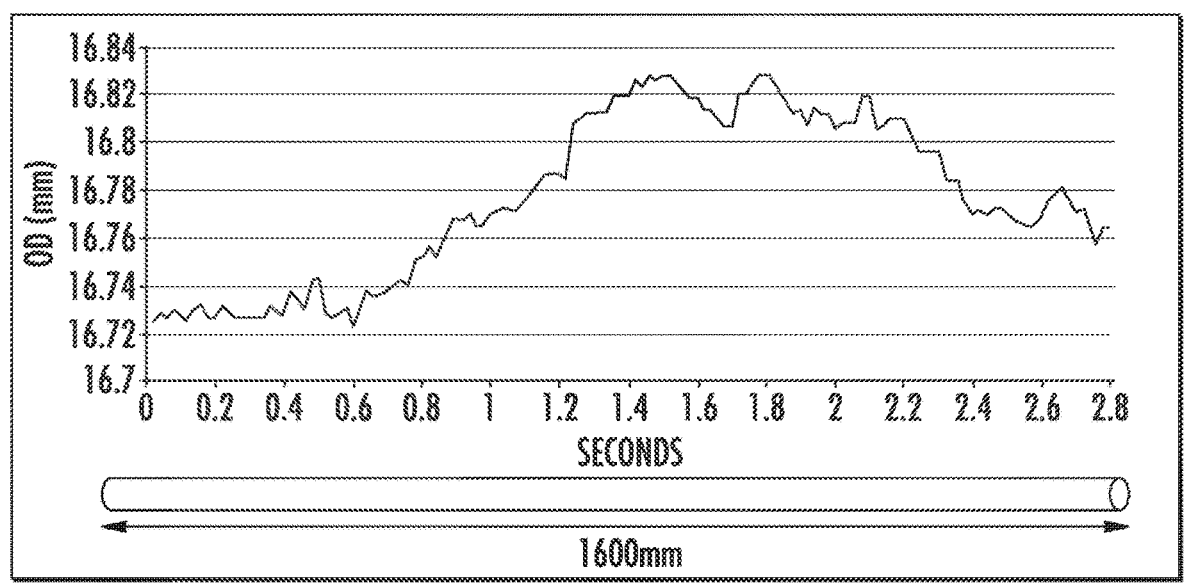
FIG. 17 is a plot of outer diameter of glass tubing over time, according to one or more embodiments shown and described herein.

The above-described methods and apparatuses include lower extended muffle structures that are used to manage convective airflow, which can reduce temperature fluctuations during tube formation. Reducing the temperature fluctuations can reduce outer diameter differences across a length of the glass tubing as the tube is being formed. Referring to FIG. 17, for example, a plot of outer diameter of glass tubing over time for a glass forming apparatus using lower extended muffle structures can result in a tube taper of 0.1 mm or less for glass tubing having a 16.75 mm target outer diameter over a length of 1.6 m. In some embodiments, the glass tube may have a predetermined target outer diameter of 20 mm or less and a glass taper of at most about 0.5 mm over a length of at least about 1 m. The lower extended muffle structures may be integrally formed as part of the muffle portion of the heating apparatuses, or the lower extended muffle structures may be formed separately from the heating apparatuses and then connected to the muffle portion. Further, the lower extended muffle structures can follow the flow path of the glass tubing from a substantially vertical orientation to a non-vertical or horizontal orientation as the glass tubing is formed. As described above, length and width of the lower extended muffle structures have an effect on the convective airflow. Further, lower extended muffle structure cover plates may also be used to manage air entrainment into the lower extended muffle structure and/or the muffle portion of the heating apparatuses.

It will be apparent to those skilled in the art that various modifications and variations can be made to the embodiments described herein without departing from the spirit and scope. Thus it is intended that the embodiments described herein cover any modifications and variations provided they come within the scope of the appended claims and their equivalents.

The invention claimed is:

1. A glass tube manufacturing apparatus for manufacturing glass tubing, comprising:
a glass delivery tank with molten glass, the glass delivery tank having a bottom opening; a bell having an upper portion with an outer diameter located at the bottom opening;
a heating apparatus at least partially disposed around the bell forming a furnace, the heating apparatus including a heated portion disposed around the bell and a muffle portion that extends about a periphery of the glass tubing and is located below the heated portion;
a lower extended muffle structure that extends downwardly from the muffle portion, the lower extended muffle structure extending about the periphery of the glass tubing to manage convective airflow therethrough; and
a cover plate that covers a bottom opening of the lower extended muffle structure, the cover plate having an opening through which the glass tubing passes, the opening of the cover plate having a smaller dimension than the bottom opening of the lower extended muffle structure,
wherein the glass tube manufacturing apparatus is configured for the glass tubing to move vertically from the bell through the muffle portion, and configured for the glass tubing to move from a vertical orientation to a horizontal orientation, and
wherein the lower extended muffle structure includes a vertically extending portion and a horizontally extending portion both extending about the periphery of the glass tubing as the glass tubing moves from a vertical orientation to a horizontal orientation, the vertically extending portion disposed between the muffle portion and the horizontally extending portion, the lower extended muffle structure supported by a support structure comprising a support supporting the lower extended muffle structure around the glass tubing, the lower extended muffle structure having a circular cross-section and having a maximum distance from the glass tubing of no more than a preselected distance along an entire length of the lower extended muffle structure.

2. The glass tube manufacturing apparatus of claim 1, wherein the lower extended muffle structure is formed separately from the heating apparatus and is connected to the muffle portion.

3. The glass tube manufacturing apparatus of claim 1, wherein the lower extended muffle structure is formed of a flexible material comprising a fabric and the preselected distance is 15 inches.

4. The glass tube manufacturing apparatus of claim 1, wherein the lower extended muffle structure is at least about 100 mm in length.

5. The glass tube manufacturing apparatus of claim 1, wherein the lower extended muffle structure has an inner diameter that is less than an inner diameter of the muffle portion.

6. The glass tube manufacturing apparatus of claim 5, wherein the lower extended muffle structure tapers to a reduced inner diameter.

7. The glass tube manufacturing apparatus of claim 1 further comprising a multiphase cooling system that removes heat from the lower extended muffle structure.

8. A heating apparatus for a glass tube manufacturing apparatus for manufacturing glass tubing, the heating apparatus comprising:
a heated portion configured to be at least partially disposed about a bell forming a furnace, the heated portion receiving molten glass as the molten glass is drawn around the bell thereby forming a glass tube;
a muffle portion that extends about a periphery of the glass tubing and that receives the glass tubing from the heated portion;
a lower extended muffle structure that extends downwardly from the muffle portion, the lower extended muffle structure extending about a periphery of the glass tubing to manage convective airflow therethrough; and
a cover plate that covers a bottom opening of the lower extended muffle structure, the cover plate having an opening through which the glass tubing passes, the opening of the cover plate having a smaller dimension than the bottom opening of the lower extended muffle structure,
wherein the heating apparatus is configured for the glass tubing to move vertically from through the muffle portion, and configured for the glass tubing to move from a vertical orientation to a horizontal orientation, and
wherein the lower extended muffle structure includes a vertically extending portion and a horizontally extending portion both extending about the periphery of the glass tubing as the glass tubing moves from a vertical orientation to a horizontal orientation, the vertically extending portion disposed between the muffle portion and the horizontally extending portion, the lower extended muffle structure supported by a support structure comprising a support supporting the lower extended muffle structure around the glass tubing, the lower extended muffle structure having a circular cross-section and having a maximum distance from the glass tubing of no more than a preselected distance along an entire length of the lower extended muffle structure.

9. The heating apparatus of claim 8, wherein the lower extended muffle structure is formed separately from the heating apparatus and is connected to the muffle portion.

10. The heating apparatus of claim 8, wherein the lower extended muffle structure is formed of flexible material comprising a fabric and the preselected distance is 15 inches.

11. The heating apparatus of claim 8, wherein the lower extended muffle structure is at least about 100 mm in length.

12. The heating apparatus of claim 8, wherein the lower extended muffle structure has an inner diameter that is less than an inner diameter of the muffle portion.

13. The heating apparatus of claim 12, wherein the lower extended muffle structure tapers to a reduced inner diameter.

* * * * *